July 1, 1930.  M. C. BERSTED  1,769,895
HOSE CLAMP
Filed Feb. 14, 1929
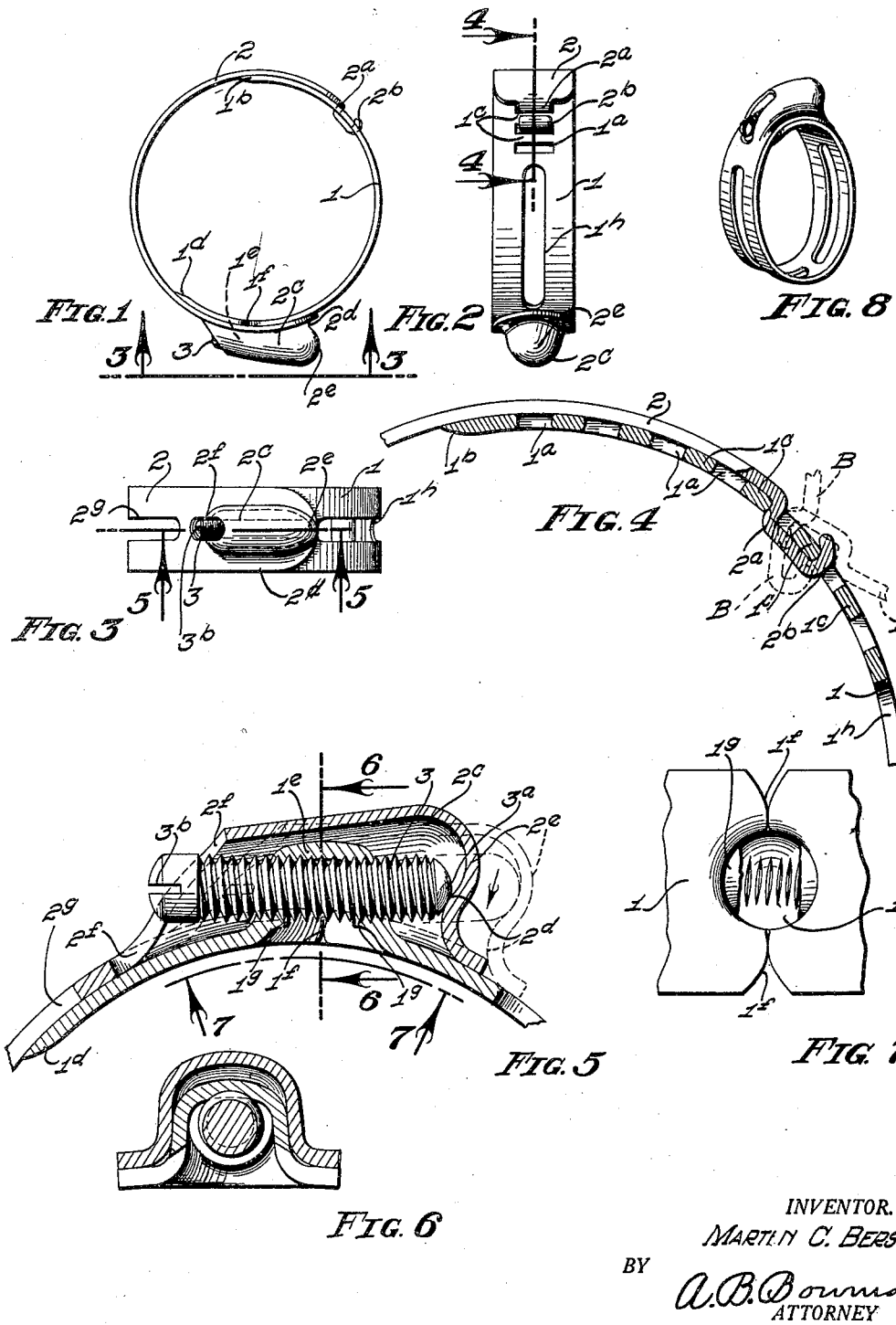
INVENTOR.
MARTIN C. BERSTED
BY
A. B. Bowman
ATTORNEY Patented July 1, 1930

1,769,895

UNITED STATES PATENT OFFICE

MARTIN C. BERSTED, OF SAN DIEGO, CALIFORNIA

HOSE CLAMP

Application filed February 14, 1929. Serial No. 339,897.

My invention relates to hose clamps and the objects of my invention are: first, to provide a hose clamp in which the one end of said clamp extends over the other end thereof forming a housing therefor and also forming an integral working part thereof; second, to provide a hose clamp which is especially adapted for garden hose or the like, there being no sharp projecting edges which might injure a person or tear his clothing; third, to provide a hose clamp which is easily fastened around a hose or removed therefrom but which cannot be accidentally dislodged; fourth, to provide a hose clamp which is desirable for clamping the hose connections of a vehicle, thereby eliminating the unsightliness of the conventional hose clamp used for such purposes; fifth, to provide a hose clamp which may be adjusted to fit various sizes of hose and in which the adjustable clamp portion has a double bearing surface so as to increase the strength of said catch; sixth, to provide a hose clamp which does not tend to dig into or cut into the hose but merely compresses it; seventh, to provide a hose clamp which presents a substantially continuous surface to the hose even between the clamping portions thereof, thus the hose cannot become pinched or ruptured as the clamp is contracted, due to the hose being forced into portions of the clamp not normally in contact with the hose; eighth, to provide a hose clamp in which the constricting tendency is distributed evenly around the hose, thereby enabling said hose to readily form a fluid sealed joint with the member to which it is attached; ninth, to provide a hose clamp in which the overlapping portions are reduced to a minimum, thereby reducing the amount of material needed, and tenth, to provide a hose clamp which is extremely simple and rugged of construction proportional to its functions, easily manufactured, readily installed, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is an elevational view of my hose clamp in its one form; Fig. 2 is another elevational view thereof taken at right angles to Fig. 1; Fig. 3 is a third elevational view thereof taken from the line 3—3 of Fig. 1; Fig. 4 is an enlarged fragmentary sectional view through 4—4 of Fig. 2 showing the catch means; Fig. 5 is an enlarged fragmentary sectional view through 5—5 of Fig. 3 showing the details of the clamp structure, with parts and portions shown in elevation to facilitate the illustration; Fig. 6 is a transverse sectional view through 6—6 of Fig. 5; Fig. 7 is a fragmentary developed view from the line 7—7 of Fig. 5 with the screw member removed, and Fig. 8 is a perspective view of my clamp in another form thereof.

Similar characters of reference refer to similar parts and portions throughout the several views of the drawings.

Two arcuate band members 1 and 2 are provided. The one end of the band member 1 is provided with a plurality of spaced apart, transversely extending slots $1^a$. This band member is adapted to extend along the inner side of the band member 2, as shown in Figs. 1, 3 and 4 of the drawings. The extended end $1^b$ of the band member 1 is beveled so that the end of the inner band will not form a projection which might rupture the hose.

The end portion of the band member 2 is provided with an inwardly offset shoulder $2^a$, as shown best in Fig. 4, the one side of which is adapted to bear against one of the transverse webs $1^c$ which separate the slots $1^a$. After forming the shoulder $2^a$ the band member 2 extends arcuately along the inner side of the band member 1 for a short distance and then forms an outwardly extending hook portion $2^b$ which is adapted to engage an adjacent web member $1^c$. Thus the catch members formed by the respective end portions of the bands 1 and 2 engage each other at two places. That is, the shoulder $2^a$ engages one web, while the hook portion 2$^b$ engages an adjacent web.

These two members are joined together by first inserting the end of the hook into one of the slots 1$^a$, as shown by the first set of dotted lines in Fig. 4, labeled A. The band member 2 is then rotated, as indicated by the arrow and the second set of dotted lines in Fig. 4, labeled B.

The other extremity of the band member 1 also extends inside of the band member 2 and is provided with a beveled end 1$^d$ similar to the beveled end 1$^b$.

Near this other extended end having the beveled portion 1$^d$, the inner band member 1 is provided with an outwardly pressed portion forming a hollow boss portion 1$^e$, as shown best in Figs. 5, 6 and 7. Notches 1$^f$ are preferably formed in opposite sides of the band member 1 before the metal is pressed out so as to enable the pressed out or hollow boss portion 1$^e$ to be formed without stretching or reducing the thickness of the metal too much.

The hollow boss portion 1$^e$ thus formed is pierced with an opening extending substantially tangential with the band member 1, as shown best in Fig. 5. This opening is preferably punched inwardly from the opposite side of the boss portion 1$^e$ forming substantially annular lip portions 1$^g$. The opening thus formed in the boss portion 1$^e$ is internally threaded to receive a screw member 3. The position of the opening is such that when it is threaded the inner surface of the upper extremity of the boss portions 1$^e$ is serrated with the grooved portions of the threads, as shown in Figs. 5, 6 and 7. By forming the lips 1$^g$ and by placing the opening adjacent to the upper extremity of the boss portion 1$^e$ so that the threads serrate the inner, upper surface thereof, a maximum threaded area is provided for receiving the screw so that considerable force may be placed on the screw 3 without stripping the threads of the boss portion.

The one end of the screw 3 facing towards the transversely slotted end of the band 1 forms a cam-like surface 3$^a$. The other end 3$^b$ of said screw is slotted or otherwise formed so as to receive a tool for turning said screw.

The extended end of the outer band 2 opposite from the catch portion thereof is pressed outwardly forming a housing portion 2$^c$ which encloses the screw and boss portion. The transverse diameter of said housing is just sufficient to receive the boss portion 1$^e$, as shown best in Fig. 6.

The longitudinal length of the housing 2$^c$ is substantially equal to the length of the screw 3. The forward end, that is the end of the housing 2$^c$ adjacent to the extended end of the band 2, curves rather abruptly outwardly from the normal surface of the band and continues this curvature until said end doubles slightly back towards the extended end of the band 2, as shown best in Fig. 5. By doing so, a cam bearing surface 2$^d$ is formed which is engageable by the cam end 3$^a$ of the screw 3. The slope of this cam surface 2$^d$ is such that pressure of the screw 3 against it tends to force this extended end of the housing towards the band 1, as indicated by the arrow in Fig. 5.

The upper portion of the cam bearing surface 2$^d$ forms a forwardly extending semi-spherical portion 2$^e$ which receives the cam end of the screw when the clamp is in its contracted position, as shown by dotted lines in Fig. 5. The housing 2$^c$ extends backwardly from the forward end thereof. The height of the housing gradually diminishes so that its upper surface extends substantially parallel with a line tangent to the band 3 near the rear end of said housing, so that when the clamp is in its contracted position, as shown by dotted lines in Fig. 5, the screw 3 will be substantially parallel with the upper surface of the housing and the cam end 3$^a$ will be opposite the forwardly pressed portion or semi-spherical portion 2$^e$ of the housing 2$^c$ so that said housing cannot be removed without first contracting the bands 1 and 2.

When the hose clamp is positioned around the hose and drawn to this position, it is clamping the hose tightly so that further constriction of the clamp is impossible, thus said clamp cannot be removed unless it is broken or the screw moved back to the position shown by the solid lines in Fig. 5.

The rear end of the housing 2$^c$ slopes more gradually than does the forward end thereof. This rear surface of the housing is provided with a longitudinally extending slot 2$^f$. The tool receiving end 3$^b$ of the screw extends slightly beyond this slot 2$^f$ so as to be readily engaged by a screw driver or other suitable tool.

It will be noted that this end of the screw is rounded so that no projecting edges are formed.

In order to increase the pressure of the clamp upon the hose so that the clamp may be interlocked to a certain extent with the hose, longitudinally extending slots 1$^h$ and 2$^g$ are provided, as shown best in Figs. 2 and 3 of the drawings.

The extended end of the band 2 having the housing 2$^c$ formed therein is rounded, as shown best in Figs. 2 and 3, so as to remove all sharp edges.

If it is not desired to make the size of the clamp adjustable, the bands 1 and 2 may be integral with each other, as indicated in Fig. 8. In this structure the clamp is even more free from projecting sharp edges.

My clamp is installed on a hose as follows:

The screw 3 is turned until its cam end 3ª is flush or slightly within the corresponding surface of the boss portion 1ᵉ. The catch portion of the clamp is then adjusted to the approximate size of the hose. The housing 2ᶜ is then slipped over the boss portion 1ᵉ, the slot 2ᶠ thereof fitting over the end 3ᵇ of the screw. When the housing is in position the screw is turned until it has reached the dotted position shown in Fig. 5, in which position the housing cannot be slipped off without further constricting the clamp as before mentioned. Also, due to the forwardly sloping surface of the semi-spherical portion at the point of contact between the cam portion 3ª and the forward end of the housing, said forward end of the housing is forced against the inner band 1.

It will be noted that the leverage obtained by the screw is directed in such a manner as to be most efficient.

It is obvious from the construction as illustrated in the drawings and described in the foregoing specification that there is provided a hose clamp as set forth in the objects of the invention and though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a hose clamp, a boss, a screw means extending therethrough, and a housing extending over said boss and said screw means, said housing engageable by said screw means.

2. In a hose clamp, a boss, a screw means extending therethrough, a housing extending over said boss and said screw means, said housing engageable by said screw means, and a constrictable band means connecting said boss and said housing.

3. In a hose clamp, a boss, a screw means extending therethrough, a housing extending over said boss and said screw means, said housing engageable by said screw means, a band connected to said boss, and a second band connected to said housing.

4. In a hose clamp, a boss, a screw extending therethrough, a housing extending over said boss and said screw, said housing engageable by said screw, a band connected to said boss, a second band connected to said housing, and catch means joining said bands forming a loop of said bands, said bands shiftable relative to each other so as to vary the size of said loop.

5. In a hose clamp, a boss, a screw extending therethrough, a housing extending over said boss member and said screw, said housing engageable by said screw, a band connected to said boss, and a second band connected to said housing, one of said bands provided with web portions separated by slots, the other of said bands provided with a catch shoulder and a catch hook, said shoulder engageable with one of said web portions and said hook engageable with an adjacent web portion.

6. In a hose clamp, a band means having overlapping end portions, a boss pressed outwardly therefrom near the one end thereof, a screw means screwably mounted in said boss and extending approximately parallel with a tangent line of said band means, and a housing pressed outwardly from the other end portion of said band means, said housing adapted to enclose said screw means and boss and be engaged by said screw means for constricting said band means.

7. In a hose clamp, a band means having overlapping end portions, a boss formed near the one end thereof, a screw means screwably mounted in said boss and extending approximately parallel with a tangent line of said band means, and a housing formed near the other end of said band means, said housing adapted to completely enclose said screw and boss means except for an opening therein adapted to permit access to said screw means, said housing adapted to be engaged by said screw means for constricting said band means.

8. In a hose clamp, a band means, comprising two arcuate band members, and catch means adjoining the one end of said band members for regulating the size of said band means, a boss formed near the other end of one of said band members, a screw means screwably mounted in said boss and extending approximately parallel with a tangent line of said band means, and a housing formed near the other end of the other one of said band members, said housing adapted to completely enclose said screw and boss means except for an opening therein adapted to permit access to said screw means, said housing adapted to be engaged by said screw means for constricting said band means.

9. In a hose clamp, a band means, comprising two arcuate band members, and catch means adjoining the one ends of said band members for regulating the size of said band means, a boss pressed outwardly from the other end of one of said band members, a screw means screwably mounted in said boss and extending approximately parallel with a tangent line of said band means, and a housing pressed outwardly from the other end portion of the other band member, said housing adapted to enclose said screw means and boss and be engaged by said screw.

10. In a hose clamp, a band means, comprising two arcuate band members, a plurality of web portions formed in one of said band members, a catch shoulder and a catch hook formed at the one end portion on the other of said band members, said shoulder and hook engageable with adjacent web portions, said band members overlapping each other at their other ends, a boss formed near the other end of one of said band members, a screw means screwably mounted in said boss and extending approximately parallel with a tangent line of said band member, and a housing formed near the other end of said other band member, said housing adapted to completely enclose said screw and boss means except for an opening therein adapted to permit access to said screw means, said housing adapted to be engaged by said screw means for constricting said band means.

11. In a hose clamp, a band means, comprising two arcuate band members, a plurality of web portions formed in one of said band members, a catch shoulder and a catch hook formed on the other of said band members, said shoulder and hook engageable with adjacent web portions, a boss pressed outwardly therefrom near the one end of said band means, a screw means screwably mounted in said boss and extending approximately parallel with a tangent line of said band means, and a housing pressed outwardly from the other end portion of said band means, said housing adapted to enclose said screw means and boss and be engaged by said screw means for constricting said band means.

12. In a hose clamp, a band means, a boss pressed outwardly therefrom near the one end thereof, a screw means screwably mounted in said boss and extending approximately parallel with a tangent line of said band means, and a housing pressed outwardly from the other end portion of said band means, said housing adapted to enclose said screw means and boss and be engaged by said screw, said screw means adapted to engage an end wall of said housing and cause contraction of said band means as said screw means is extended.

13. In a hose clamp, a band means, comprising two arcuate band members, and catch means adjoining the ends of said band members for regulating the size of said band means, a boss formed near the one end of said band means, a screw means screwably mounted in said boss and extending approximately parallel with a tangent line of said band means, and a housing formed near the other end of said band means, said housing adapted to completely enclose said screw and boss means except for an opening therein adapted to permit access to said screw means, said housing adapted to be engaged by said screw means for constricting said band means, said screw means adapted to engage an end wall of said housing and cause contraction of said band means as said screw means is extended.

14. In a hose clamp, a band means, comprising two arcuate band members, and catch means adjoining the ends of said band members for regulating the size of said band means, a boss pressed outwardly from the one end of said band means near the one end thereof, a screw means screwably mounted in said boss and extending approximately parallel with a tangent line of said band means, and a housing pressed outwardly from the other end portion of said band means, said housing adapted to enclose said screw means and boss and be engaged by said screw, said screw means adapted to engage an end wall of said housing and cause contraction of said band means as said screw means is extended.

15. In a hose clamp, a band means comprising two arcuate band members, a plurality of web portions formed at one of said band members, a catch shoulder and a catch hook formed on the other of said band members, said shoulder and hook engageable with adjacent web portions, a boss formed near the one end of said band means, a screw means screwably mounted in said boss and extending approximately parallel with a tangent line of said band means, and a housing formed near the other end of said band means, said housing adapted to completely enclose said screw and boss means except for an opening therein adapted to permit access to said screw means, said housing adapted to be engaged by said screw means for constricting said band means, said screw means adapted to engage an end wall of said housing and cause contraction of said band means as said screw means is extended.

16. In a hose clamp, a contractible band means having overlapping end portions, a boss extending outwardly from the inner one of said end portions and an elongated housing extending outwardly from the other of said end portions and adapted to fit over said boss portion, and means for causing said housing to slide longitudinally relative to said boss portion for contracting or expanding said band means.

17. In a hose clamp, a band member, a pressed out portion at each end thereof, the one of said pressed out portions adapted to fit over the other, and means enclosed by one of said pressed out portions for shifting said pressed out portions relative to each other so as to vary the size of said band member.

In testimony whereof, I have hereunto set my hand at San Diego, California, this 29th day of January, 1929.

MARTIN C. BERSTED.